United States Patent [19]

Mullins et al.

[11] Patent Number: 5,556,440

[45] Date of Patent: Sep. 17, 1996

[54] PRESSURE-ACTUATED RADIAL AIR FILTER SEAL

[75] Inventors: Gene Mullins; Zemin Jiang; Art P. Piccirilli, all of Cookeville, Tenn.

[73] Assignee: Fleetguard, Inc., Nashville, Tenn.

[21] Appl. No.: 326,756

[22] Filed: Oct. 20, 1994

[51] Int. Cl.⁶ ............................................. B01D 46/24
[52] U.S. Cl. .................... 55/498; 55/502; 55/520
[58] Field of Search ..................... 55/498, 502, 507, 55511, 520, 521, 482; 95/273

[56] References Cited

U.S. PATENT DOCUMENTS

| | | | |
|---|---|---|---|
| 2,962,121 | 11/1960 | Wilber | 55/480 |
| 2,988,170 | 6/1961 | Pritchard | 55/502 |
| 3,078,650 | 2/1963 | Anderson et al. | 55/337 |
| 3,147,100 | 9/1964 | Wilber | 55/419 |
| 3,169,844 | 2/1965 | Young | 55/498 |
| 3,423,909 | 1/1969 | Bennett et al. | 55/502 |
| 3,672,130 | 6/1972 | Sullivan et al. | 55/323 |
| 3,906,724 | 9/1975 | Yoshizaki | 60/305 |
| 4,020,783 | 5/1977 | Anderson et al. | 55/502 |
| 4,113,627 | 9/1978 | Leason | 210/446 |
| 4,128,251 | 12/1978 | Gaither et al. | 277/233 |
| 4,135,899 | 1/1979 | Gauer | 55/482 |
| 4,159,197 | 6/1979 | Shuler et al. | 55/379 |
| 4,211,543 | 7/1980 | Tokar et al. | 55/485 |
| 4,227,898 | 10/1980 | Kamekawa et al. | 55/276 |
| 4,235,611 | 11/1980 | Brownell | 55/309 |
| 4,312,651 | 1/1982 | Esaki et al. | 55/502 |
| 4,314,832 | 2/1982 | Fox | 55/502 |
| 4,322,230 | 3/1982 | Schoen et al. | 55/502 |
| 4,349,363 | 9/1982 | Patel et al. | 55/498 |
| 4,350,509 | 9/1982 | Alseth et al. | 55/337 |
| 4,369,113 | 1/1983 | Stifelman | 210/440 |
| 4,443,237 | 4/1984 | Ulvestad | 55/379 |
| 4,488,889 | 12/1984 | McCarroll | 55/502 |
| 4,491,460 | 1/1985 | Tokar | 55/337 |
| 4,507,203 | 3/1985 | Johnston | 210/445 |
| 4,609,465 | 9/1986 | Miller | 210/232.2 |
| 4,634,527 | 1/1987 | Marshall | 55/502 |
| 4,720,292 | 1/1988 | Engel et al. | 55/337 |
| 4,759,783 | 7/1988 | Machado | 55/498 |
| 4,838,901 | 6/1989 | Schmidt et al. | 95/90 |
| 4,950,317 | 8/1990 | Dottermans | 55/337 |
| 5,030,264 | 7/1991 | Klotz et al. | 55/481 |
| 5,043,114 | 8/1991 | Saito et al. | 264/46.6 |
| 5,082,476 | 1/1992 | Kahlbaugh et al. | 95/287 |
| 5,112,372 | 5/1992 | Boeckermann | 55/276 |
| 5,120,337 | 6/1992 | Benzler et al. | 55/482 |
| 5,167,683 | 12/1992 | Behrendt et al. | 55/478 |
| 5,222,488 | 6/1993 | Forsgren | 55/502 |
| 5,250,179 | 10/1993 | Spearman | 210/315 |
| 5,415,677 | 5/1995 | Ager et al. | 55/502 |
| 5,484,466 | 1/1996 | Brown et al. | 55/498 |

FOREIGN PATENT DOCUMENTS

| | | |
|---|---|---|
| 0470328A1 | 3/1991 | European Pat. Off. . |
| 0470330A1 | 4/1991 | European Pat. Off. . |
| 2261041 | 9/1975 | France . |
| 2268551 | 11/1975 | France . |
| 59-141150 | 9/1984 | Japan . |
| WO91/13675 | 9/1991 | WIPO . |

OTHER PUBLICATIONS

Owner's Manual, Sears Craftsman Engine Model No. 143.354212, pp. 1, 3, 7, and 8. Feb. 1, 1988.
Tecumseh Products Co., Engine Divisions, Filter–Air Cleaner, Drawing No. 100–96, Sh. 1., Feb. 23, 1989.
Tecumseh Products Co., Engine Divisions, Collar–Air Cleaner, Drawing No. 71–0–3. Feb. 23, 1989.

Primary Examiner—Jay H. Woo
Assistant Examiner—Duane S. Smith
Attorney, Agent, or Firm—Woodard, Emhardt, Naughton, Moriarty & McNett

[57] ABSTRACT

A filter seal for a substantially cylindrical air filter includes an integrally molded, polyurethane member which is configured with two primary portions. One portion is an annular body which is formed with an annular receiving channel, like a potting shell, which in turn is sized so as to receive one end of a corresponding filter element. The other portion is an annular sealing lip which is disposed in spaced relation to the receiving channel. This sealing lip includes a specific geometry providing both a ribbed, radial-sealing surface and a convex, axial-sealing surface. The radial-sealing surface provides sealing contact with a generally cylindrical outlet portion of the housing in which the filter element is placed in tension while axial sealing is achieved by compression of the axial-sealing surface against a generally planar surface of the housing. In addition to these two modes of sealing engagement, when the unit is in operation as part of a vehicle, differential pressure forces cause the sealing lip to press more tightly against the housing so as to enhance the sealing. The molding process which completes the fabrication of the filter seal concurrently bonds the filter seal to the filter element.

5 Claims, 9 Drawing Sheets

PRESSURE-ACTUATED RADIAL AIR FILTER SEAL

BACKGROUND OF THE INVENTION

The present invention relates in general to air filters which are intended for trucks and related vehicles and which are of the type using a cylindrical, pleated paper filtering element. More particularly, the present invention relates to the design of a seal member placed between one end of the filtering element and a filter housing so that air entering the housing passes through the filtering element before exiting from the filter housing.

The task of sealing a pleated paper filtering element within a filter housing has been attempted in a number of different ways. One approach used in certain designs is to compress the outlet end of the filter element against the end wall of the housing, with a gasket disposed between the end of the filter element and the housing end wall. An illustration of this design approach is shown in U.S. Pat. No. 3,078,650 which issued Feb. 26, 1963 to Anderson et al.

A variety of latches and clamping devices have been used to effect a positive clean air seal in air filter assemblies. However, the use of axial compression sealing techniques requires that the filter elements be constructed so as not to collapse under compression, and requires the use of relatively heavy-gauge steel in the housing. Because both the filter housing and the filter element must be strong and rigid when using such techniques, improvements in the area of low-cost, lightweight elements in housings have been slowed. Nevertheless as to the filter housing, non-engineering grades of plastic as well as some molding processes have been envisioned as a possibility for lower cost and lighter weight. U.S. Pat. No. 4,720,292 which issued Jan. 19, 1988 to Engel et al. is representative of attempts to use certain grades of plastics and other materials in order to create a lightweight housing. In Engel et al., a positive clean air seal is established between the radially inwardly facing surface of the filter element end cap and a tubular air outlet member so that there is no need to axially compress the filter element as in earlier designs in order to achieve a seal between the end of the filter element and the housing. In what is described as the preferred embodiment of Engel, this particular design intention is accomplished by molding a ring-like end cap at the open end of the filter element from a urethane foam material having a relatively soft, rubber-like consistency. The cylindrical inner surface of this gasket is constructed and arranged to fit around and sealingly engage (radial compression) an inner end portion of a tubular air outlet member. In this manner, a relatively lightweight housing can then be provided to channel the flow of air through the filter element. No mechanical aids or clamps are necessary to exert outside sealing force because the seal is self-generated when the end cap is inserted over and around the tubular outlet member. Although Engel may represent a current approach in the use of lightweight materials for the outer housing, there are other design approaches relating to air filters, air cleaners and seal designs which have been conceived over the years. The following patent references are representative of some of these other design approaches:

| Patent/Publication No. | Patentee/Inventor | Issue/Publication Date |
|---|---|---|
| 4,488,889 | McCarroll | December 18, 1984 |
| 4,759,783 | Machado | July 26, 1988 |
| 4,950,317 | Dottermans | August 21, 1990 |
| 5,030,264 | Klotz et al. | July 9, 1991 |
| WO 91/13675 | Machado | September 19, 1991 |
| O 470 330 Al(EP) | Behrendt | April 6, 1991 |
| O 470 328 Al(EP) | Benzler | March 30, 1991 |
| 5,043,114 | Saito et al. | Aug. 27, 1991 |
| 4,113,627 | Leason | Sep. 12, 1978 |
| 4,350,509 | Alseth et al. | Sep. 21, 1982 |
| 4,838,901 | Schmidt et al. | Jun. 13, 1989 |
| 5,082,476 | Kahlbaugh et al. | Jan. 21, 1992 |
| 3,906,724 | Yoshizaki | Sep. 23, 1975 |
| 4,443,237 | Ulvestad | Apr. 17, 1984 |
| 5,120,337 | Benzler et al. | Jun. 9, 1992 |
| 5,167,683 | Behrendt et al. | Dec. 1, 1992 |

In contrast to the approach followed by these earlier designs as represented by the identified patents, Raines et al. pursued a different approach as is disclosed in U.S. filed Nov. 4, 1993, now abandoned. The '647 application discloses a sealing element (gasket) which is configured so as to provide three sealing portions which work independently of each other but which combine to provide a design with improved reliability and effectiveness. One sealing portion is a radial seal which is arranged so as to be placed in tension for sealing instead of being placed in compression. Another sealing portion, also in tension, is created by axial interference and the third sealing portion uses axial compression. The Raines et al. invention is such that the sealing gasket can be applied to a conventional metal end plate as positioned over one end of the filtering element. The Raines et al. invention may also be used within a housing of the design provided in the 4,720,292 Engel patent but without the use of the molded urethane end cap 25.

The present invention improves upon the Raines et al. approach as disclosed in the '647 application and upon the Engel ('292) approach by maintaining three different sealing mechanisms, but doing so by means of a molded, unitary, polyurethane end cap which fits over the end of the filter media, precluding the separate use of an endplate (item 46 in Raines et al.). The present invention also improves upon the Engel ('292) approach which does disclose a molded end cap (25), by the specific style and shape of the engaging sealing portion of the molded end cap. The molded end cap/seal combination of the present invention performs the combined functions of the end cap, an adhesive compound such as "Plastisol", the sealing gasket and any additional glue or the adhesive of earlier designs.

The molded end cap and gasket combination of the present invention provides all of its sealing interfaces at locations which are below the plane of the lower surface of the filter element and sealing is accomplished through three different mechanisms. When the filter is installed, the sealing portion of the present invention gasket is deflected and placed in tension around the center post of the air filter housing. The lower surface of the present invention gasket is placed in compression against the bottom of the air filter housing by installing the air filter housing cover. Finally, differential pressure forces cause the gasket to seal more tightly against the center post of the housing during engine operation.

The easiest way to view the present invention relative to the prior work of Raines et al. ('647) and Engel et al. ('292) is to first recognize that the molded end cap design of the present invention can be used in either of these two housing styles. Raines et al. provides a heavier package with axial clamping while Engel et al. focuses more on a lightweight, plastic construction without the higher levels of axial clamping force. Further, the present invention employs a molded end cap, as does Engel et al., and three modes of sealing, as is provided by Raines et al. However, the present invention pursues a completely different approach than is what is represented by the molded end cap of Engel et al. and the style of seal in the present invention is significantly different from what has been provided by the Raines et al. disclosure.

According to the present invention the end cap portion of the combination provides radial sealing against the center post of the filter housing but provides such radial sealing by means of tension rather than being placed in compression as is done in the Engel et al. design. This makes the present invention somewhat more forgiving as to the various dimensions and tolerances and provides greater ease as to its construction and assembly. The present invention does not require a back-up support surface for radial compression as is required by the Engel et al. design. The three types of modes of sealing provide greater reliability and seal integrity. The geometry, size, shape and location of the sealing portion of the end cap of the present invention is unique over any of the earlier patent references or other disclosures.

There are in fact other patent references which were made of record in the first and second reexaminations of Engel et al. (B1 4,720,292 and B2 4,720,292) and which have not been listed or mentioned above. Since the focus of Engel et al. is on the specific style and geometry of a molded end cap, and since the present invention embodies a molded end cap, some of these other patent references may be regarded as pertinent and the selected references include the following:

| Patent/Publication No. | Patentee/Inventor | Issue/Publication Date |
| --- | --- | --- |
| 2,962,121 | Wilber | Nov. 29, 1960 |
| 3,147,100 | Wilber | Sep. 1, 1964 |
| 3,169,844 | Young | Feb. 16, 1965 |
| 3,672,130 | Sullivan et al. | Jun. 27, 1972 |
| 4,128,251 | Gaither et al. | Dec. 5, 1978 |
| 4,135,899 | Gauer | Jan. 23, 1979 |
| 4,159,197 | Shuler et al. | Jun. 26, 1979 |
| 4,211,543 | Tokar et al. | Jul. 8, 1980 |
| 4,227,898 | Kamekawa et al. | Oct. 14, 1980 |
| 4,235,611 | Brownell | Nov. 25, 1980 |
| 4,491,460 | Tokar | Jan. 1. 1985 |
| 4,609,465 | Miller | Sep. 2, 1986 |
| 2 268 551 | French-Girard | Nov. 21, 1975 |
| 2 261 041 | French-Mavel | Sep. 12, 1975 |
| 59-141150 | Japan-Fukumoto et al. | Sep. 20, 1984 |
| 4,349,363 | Patel, et al. | Sep. 14, 1982 |
| 4,369,113 | Stifelman | Jan. 18, 1983 |
| 4,507,203 | Johnston | Mar. 26, 1985 |
| 5,112,372 | Boeckermann et al. | May 12, 1992 |
| 5,250,179 | Spearman | Oct. 5, 1993 |

While there are a wide variety of filter housings, gaskets and sealing concepts represented by these listed references, none anticipate nor render obvious the present invention.

SUMMARY OF THE INVENTION

A molded, annular filter seal for receipt by a generally cylindrical filter element which is installed within a filter housing according to one embodiment of the present invention comprises an annular body portion formed with an annular receiving channel which is sized to fit securely over one end of the filter element and a sealing lip portion disposed in space relation to the receiving channel and including a radial sealing surface adapted to provide radial sealing with the housing while in tension and an axial sealing surface which is adapted to provide axial sealing with the housing while in compression.

One object of the present invention is to provide an improved molded end cap and gasket combination.

Related objects and advantages of the present invention will be apparent from the following description.

DESCRIPTION OF THE PREFERRED EMBODIMENT

Figure 1:
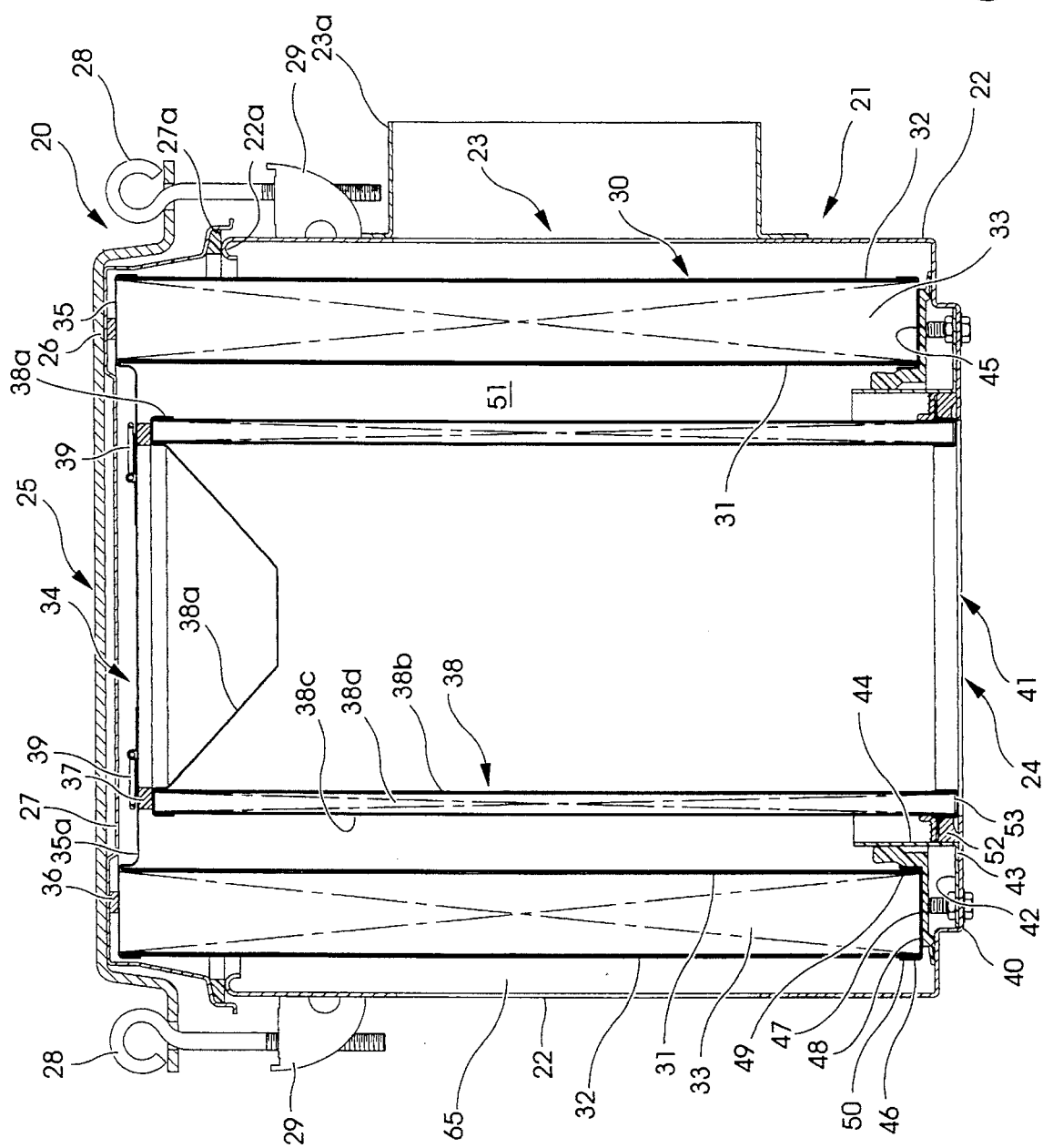
FIG. 1 is a front elevational view in full section of an air filter incorporating a triple seal gasket according to the earlier patent application disclosure of Raines et al.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 (prior art) there is an illustration of an earlier filter design according to the Raines et al. patent application disclosure, Ser. No. 08/147,647. This prior art illustration is provided in order to provide a beginning point of discussion or foundation for the present invention. The focus of the present invention is on the design of the outer filter element (item 30 in Raines et al.) and in particular the area of the end plate 46 and gasket 54.

In the Raines et al. design of air filter cleaner 20, an inner filter element 38 is used, as one option, but the design of the present invention is not affected by either the presence or absence of such an inner filter element.

Still referring to FIG. 1, air cleaner 20 includes an outer housing 21 with a generally cylindrical outer wall 22 which includes a generally circular air inlet opening 23 surrounded by air inlet sleeve 23a which is welded to outer wall 22. Housing 21 includes a partially closed first end 24 and a generally open second end 25. The closing of second end 25 is accomplished by means of clamping bracket 26 in cooperation with cover 27. The top lip 22a of outer wall 22 is rolled so as to present a smoothly radiused edge and annular ring gasket 27a is compressed between cover 27 and top lip 22a. The clamping force for gasket 27a is delivered by clamping bracket 26 through the threaded engagement of the two eyebolts 28 into the two wings 29. The two wings 29 are welded to the outer wall 22 at diametrically opposite locations and the clamping bracket is a formed metal bar approximately ½ inches (58.1 mm) wide. As the two eyebolts 28 are tightened the clamping bracket 26 presses down on cover 27 causing sealing engagement of the cover relative to housing 21 through gasket 27a.

A generally tubular or cylindrical outer filter element 30 is carried within housing 21 and is generally coaxial therewith. The filter element 30 includes a generally cylindrical inner liner 31 and coaxial therewith a generally cylindrical outer liner 32. The two liners are constructed from perforated metal.

A generally cylindrical pleated paper filter 33 is disposed between the inner liner 31 and the outer liner 32. Filter element 30 has a closed end 34 in the form of a generally circular end cap 35 which is fabricated of metal and adhesively bonded to the end of filter element 30. End cap 35 is formed so as to fit snugly over and generally hold together the ends of the inner liner 31, outer liner 32 and filter 33 and extends across end 34 to completely close it.

Disposed between cover 27 and metal end cap 35 is an annular ring gasket 36 which is generally centered over filter element 30. Gasket 36 functions primarily as a spacer because the location of gasket 36 between cover 27 and end cap 35 does not require tight sealing. The use of end cap 35 to completely close off the end 34 of filter element 30 prevents any by-pass flow which might exit without passing through the filter 33.

In the illustrated embodiment of FIG. 1 end cap 35 has a recessed, interior shelf 35a which closes off the interior of filter element 30 and is used to establish an upper abutment surface for annular ring gasket 37. Gasket 37 is positioned between the closing end cap 38a of inner filter element 38 and shelf 35a and provides a spacer at that location. Due to the fact that the upper end of filter element 38 is closed off completely by means of end cap 38a which is adhesively bonded in place, gasket 37 does not need to provide a tight seal. Filter element 38 includes a generally cylindrical inner liner 38b, a generally cylindrical outer liner 38c and therebetween a pleated paper filter 38d. The inner filter element 38 is located within the outer filter element 30 and is generally coaxial therewith.

One alternative to the design of FIG. 1 is to close off the end of filter element 30 by an annular ring-shaped metal end cap. In order to establish a seal between an annular ring-shaped end cap and cover 27, a molded ring of urethane foam rubber material (like gasket 36) can be placed between the cover and the filter element end cap. With either style, the layer of urethane foam rubber material or gasket 36 may be bonded to the end cap so as to simplify the design and replacement of the filter element. With this construction once the cover is removed from the remainder of the housing, the filter element can be pulled out, discarded and a new (clean) filter element inserted. Bail handles 39 which are illustrated in a hinged-down orientation and which are attached to the top surface of shelf 35a are provided to assist with the removal of the filter element. The metal end cap helps to maintain the assembly of component parts for the filter element such that it can be handled and inserted as a single member. As an enhancement to this overall design, the thickness of molded urethane foam rubber material may be contoured with a receiving channel in the shape of an annular ring having a width equal to the dimension across the inner and outer liners such that the filter element will fit down snugly into this recessed or contoured channel.

What has been described and identified as the partially closed first end 24 of housing 21 includes a stepped wall portion 40 which extends radially inwardly from outer wall 22 and ends at generally circular exit opening 41 which is defined by wall portion 40 and which is generally concentric with outer wall 22. Mounted within and to wall portion 40 is a generally cylindrical outlet member 42. Member 42 includes a lower, substantially flat radial wall 43 and generally normal thereto an axially extending, generally cylindrical inner wall 44. Outlet member 42 is secured in place against the innermost and lowermost section of wall portion 40 by means of mechanical fasteners. In the preferred embodiment these two component parts are bolted together, though other techniques such as riveting could be used. Although some sealing between these two components is in fact established by this mechanical connection, a complete seal is not necessary due to the presence of the triple seal gasket disposed between the housing and the filter element and to be described hereinafter.

The lower end 45 of filter element 30 includes a metal end plate 46 which has an annular ring shape, generally matching the size and shape of filter element 30, and an inverted, generally U-shaped lateral cross section. End plate 46 includes a bottom wall 47 which lays against the lower end 48 of filter 33 and sidewalls 49 and 50 which extend up and around inner liner 31 and outer liner 32, respectively. End plate 46 seals closed the end of filter 33 so as to ensure in cooperation with end cap 35, that air flow entering the filter element 30 through outer liner 32 passes entirely through filter 33 and out through inner liner 31 into the interior 51 of air filter 20. The filtered air then passes through inner filter element 38 and from there exits through outlet member 42 and exit opening 41. When an inner filter element 38 is used, the flow and sealing needs are generally arranged in two stages. The first stage is to seal to or around both ends of the outer filter element 30 so that incoming air flow is controlled and directed through the filter element rather than by-passing it. End cap or end plate 35 accomplishes this task at one end of filter element 30. At the opposite end a triple seal gasket, disposed between the filter element and the housing, is used in cooperation with end plate 46.

If the present invention is used in combination with a light-weight plastic housing, the housing may be styled similar to the plastic housing disclosed in the Engel et al.

patent (U.S. Pat. No. 4,720,292). Referring to this particular disclosure by way of FIGS. 2 and 3 (prior art) there is an illustration of the Engel housing 70 which is disposed as part of an air cleaner. Housing 70 has a generally cylindrical outer wall 70a, a first generally closed end 70b comprising a generally circular end wall having an axial outlet opening 70c, and a generally open second end having a circular outwardly extending flange 70d to which is connected a removable cover 71 by means of a plurality of threaded bolts 72a and plastic nuts 72b. Housing 70 is cylindrical with respect to a longitudinal axis 73. Formed in the outer wall 70a is a peripheral air inlet opening 74.

A generally tubular or cylindrical filter element 75 is carried within housing 70 coaxial therewith. Filter element 75 has an inner liner 75a and an outer liner 75b, both being cylindrical, and both being constructed from perforated metal. A cylindrical pleated paper filter 76 is mounted between the inner liner 75a and the outer liner 75b. Filter element 75 has a closed end 77 in the form of a circular cap of a urethane foam material molded thereon and having a relatively soft, rubber-like consistency. Cap 77 is molded over and holds together the ends of liners 75a, 75b and filter 76 and extends across that end of the filter element 75 to provide a closed end. Cap 77 has a plurality of protrusions 77a extending axially outwardly therefrom for contact with the cover 71. The diameter of housing 70 around cap 77 is about the same as the outside diameter of the cap 77 so as to hold filter element 75 centered within the housing.

Figure 2:
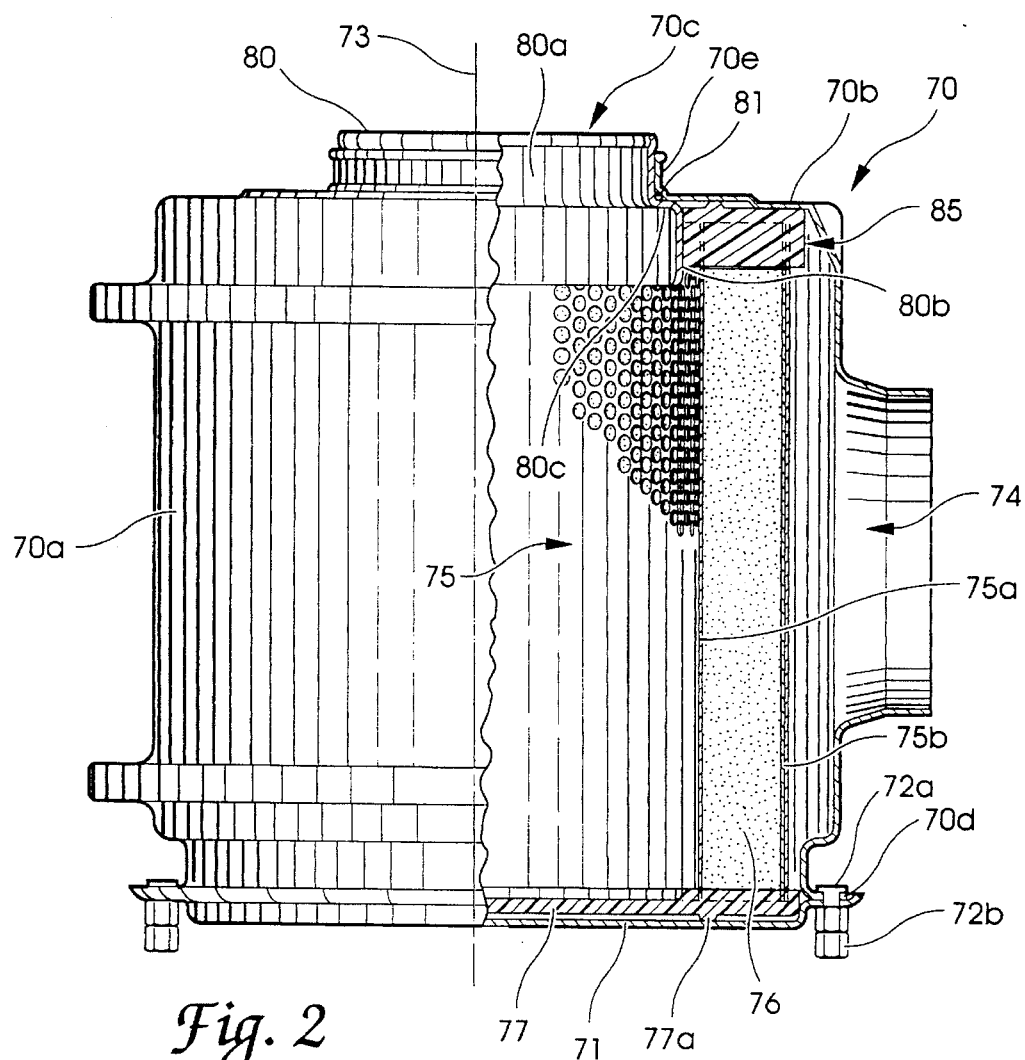
FIG. 2 is a front elevation view in partial section of a filter element as installed within a housing according to the disclosure of the Engel et al. patent.

Closed end wall 70b is provided with an axially outwardly extending tubular portion 70e around axial air outlet opening 70c. A generally cylindrical outlet member 80 is mounted in outlet opening 70c having an outer smaller diameter portion 80a and an inner larger diameter portion 80b connected by a planar ring portion 80c. The axially outer end of outer portion 80a is formed to be of slightly larger diameter to provide a wide groove between it and ring portion 80c which conforms in shape and size to the inner surface of tubular portion 70e of housing 70 so that when tubular member 80 is inserted into axial opening 70c from the interior of housing 70 the outer portion 80a thereof snaps over and snugly engages tubular portion 70e, and ring portion 80c engages the inner surface of housing end wall 70b to hold the tubular member 80 in place. The housing is shaped at the junction of wall 70b and tubular portion 70e to provide a circular opening for an O-ring seal 81 which functions to prevent air leakage between housing 70 and tubular member 80. When mounted in place as shown in FIG. 2, the inner portion 80b of tubular member 80 extends a short distance into the interior filter element 75 coaxially therewith.

Figure 3:
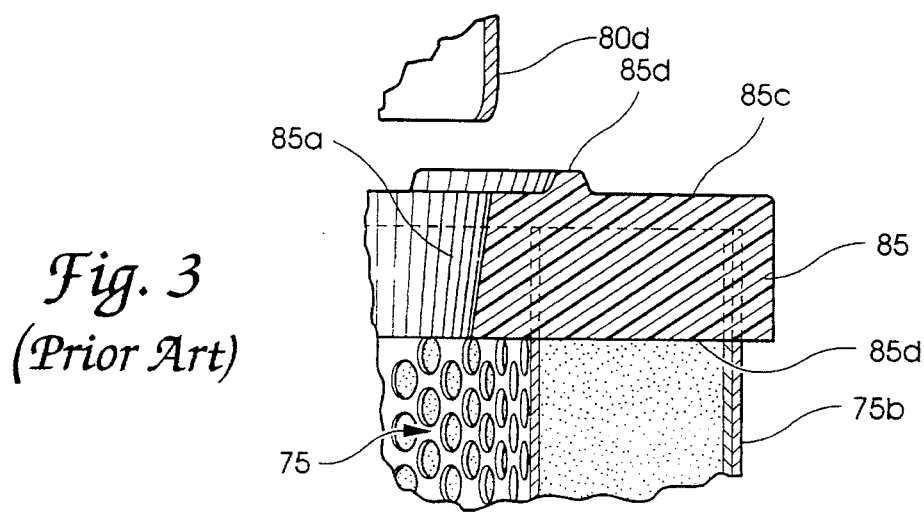
FIG. 3 is an enlarged fragmentary portion of the outlet area of the FIG. 2 structure showing the tubular outlet member removed from the resilient end cap all according to the Engel et al. patent disclosure.

The open end of filter element 75, adjacent closed end 70b of the housing 70, is provided with a ring-like end cap 85 which is molded over the ends of the liners 75a, 75b and pleated paper filter 76. End cap 85 is preferably made from an elastomer such as a urethane foam material having a relatively soft, rubber-like consistency so that it is capable of functioning as a seal or gasket material. End cap 85, as shown in FIG. 3, is preferably molded so as to have a radially inwardly facing surface between the end edges thereof, most of which has a diameter slightly smaller than the outer diameter of inner portion 80b of tubular member 80. In the preferred embodiment the inwardly facing surface 85a has a diameter at the outer face 85c of end cap 85 of about the same size as the outer diameter of the tubular member 80 and a gradually reducing diameter toward the inner face 85d of end cap 85 which is less than the outside diameter of member 80. The elastomer material of end cap 85 is thus compressed at the surface 85a to provide a positive clean air seal between the end cap 85 and the outlet member 80. As also shown in FIG. 3, the innermost end of portion 80b is formed to have a slightly smaller diameter so that end cap 85 can easily be inserted over portion 80b. End cap 85 thus has a generally cylindrical inner surface 85a of gradually reducing diameter from outside to inside constructed and arranged to fit over and sealingly engage the inner portion 80b of outlet member 80 to thus provide a positive air seal between the end cap 85 and inner portion 80b of outlet member 80.

End cap 85 is also provided with a plurality of axially outwardly extending, arcuate projections or protrusions 85b which engage end wall 70b to hold the filter element in place. The relationship between end cap 85 and tubular outlet member 80 maintains filter element 75 in a coaxial relationship with housing 70 at the outlet end of the air cleaner.

The distance between closed end 70b of housing 70 and cover 71 is such as to lightly compress the projections or protrusions 77a and 85b to minimize or dampen axial movements of filter element 75 in the housing 70.

Figure 8:
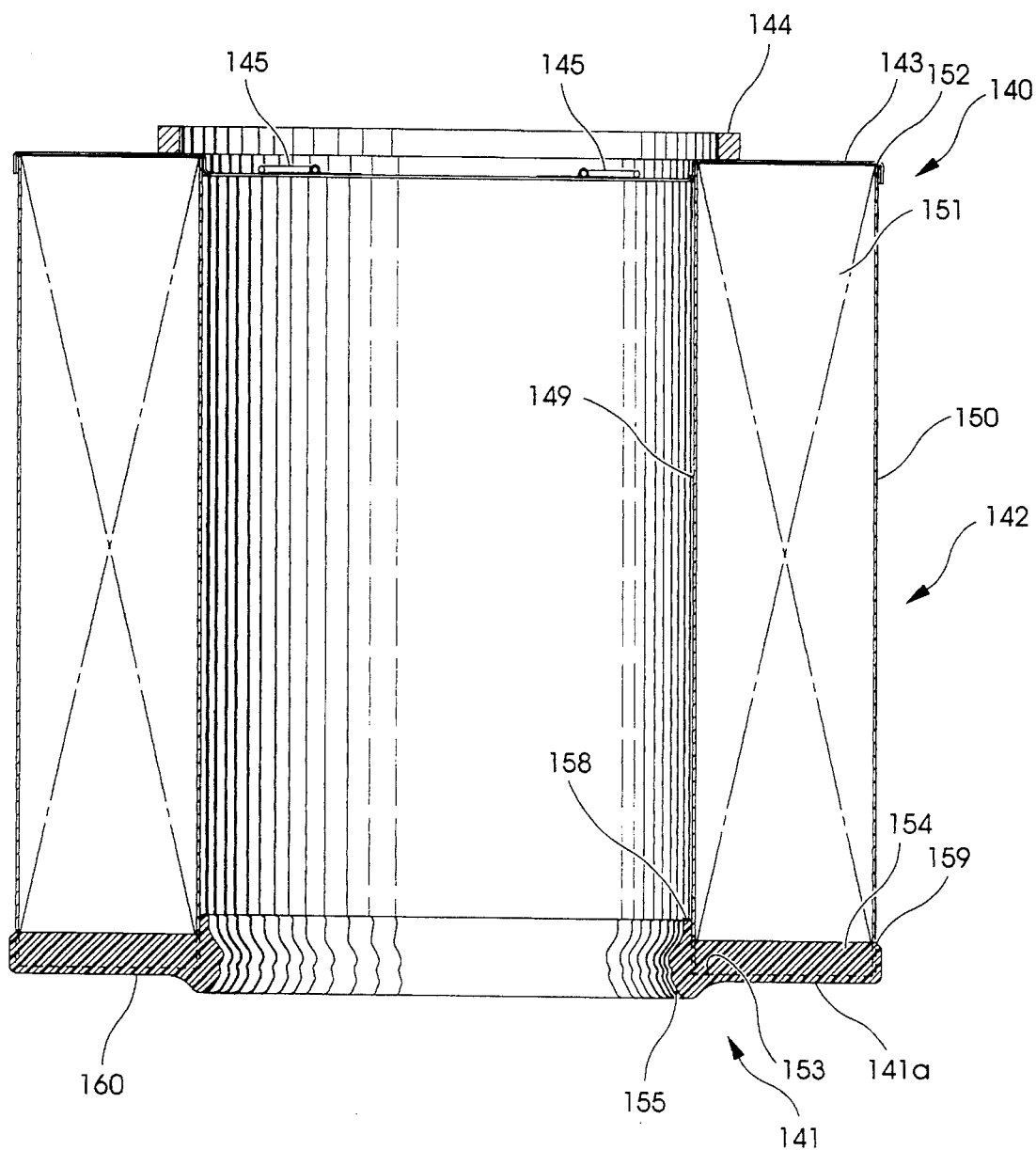
FIG. 8 is a front elevational view in full section of an air filter in combination with a filter seal according to another embodiment of the present invention.
Figure 9:
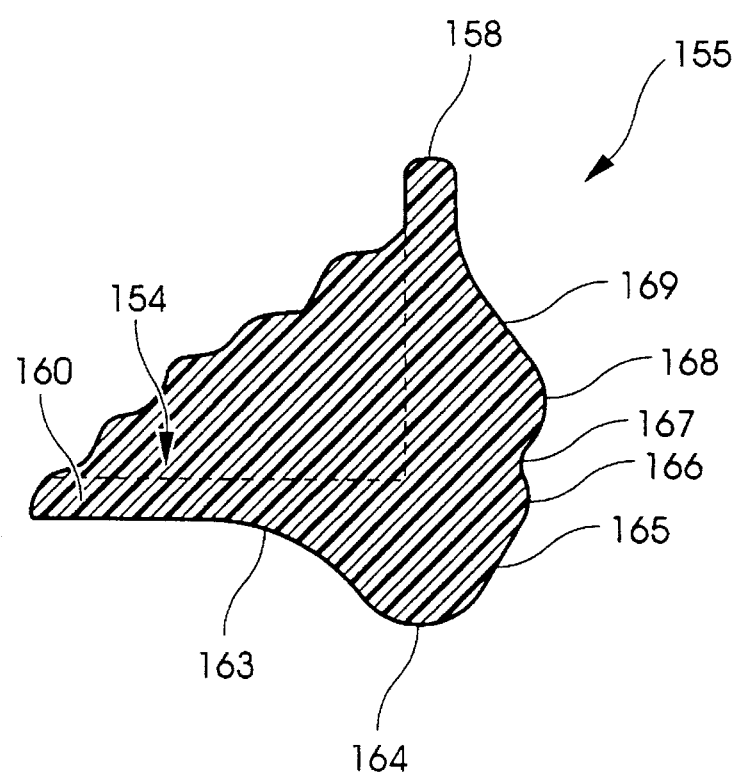
FIG. 9 is an enlarged detail of a portion of the FIG. 8 filter seal according to the present invention.
Figure 10:
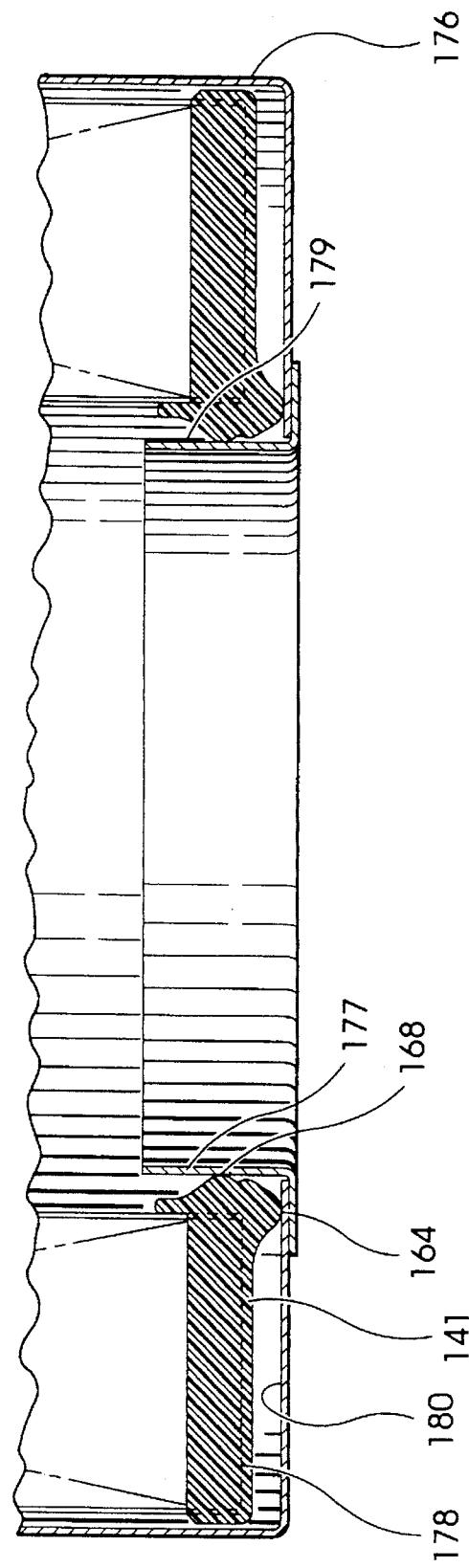
FIG. 10 is a partial, front elevational view in full section of the FIG. 8 filter seal as engaging a filter housing and center post in sealing contact both radially and axially according to the present invention.

Referring to FIGS. 4, 5, 6, and 7 there is illustrated an air filter 90 which includes a pressure-actuated radial air filter seal 91 designed according to one embodiment of the present invention. A second embodiment of the present invention is illustrated in FIGS. 8, 9 and 10. The only significant difference between these two embodiments is the specific size, shape and contour of the two filter seals. Generally speaking, it is intended that either air filter 90 or air filter 140 may be substituted for air filter 30 of the FIG. 1 (prior art) assembly or for filter element 75 of the FIG. 2 (prior art) assembly. While this is the intent, if the specific size or shape of either housing changes, certain modifications may need to be made to the corresponding air filter in order for either air filter 90 or air filter 140 to be properly received. Air filter 90 includes, in addition to filter seal 91, a generally cylindrical filter element 92, upper end plate 93, an optional upper end annular seal 94 and two bail handles 95 which are securely attached to end plate 93 in order to assist in lifting the air filter 90 out of its corresponding housing. Annular seal 94, while being illustrated, is still considered an optional component. Another option is to replace the two bail handles 95 with a single, larger bail handle (not illustrated).

Filter element 92 includes a perforate, generally cylindrical inner liner 99 and coaxial therewith a perforate, generally cylindrical outer liner 100. A generally cylindrical pleated paper filter 101 is disposed between the inner liner 99 and the outer liner 100. Filter element 92 is sealed closed across its upper end 102 by a covering layer of adhesive which securely bonds end plate 93 to the filter element. The opposite, lower end 103 of the filter element is sealed closed by radial air filter seal 91 which is a unitary, molded polyurethane member. As described herein one fabrication method is to tooled seal 91 by means of a two-step process. While a single step process can be used, that procedure is relatively straight forward. The two-step method is believed to be unique and is thus discussed in greater detail herein. In the two-step method, the final process step actually bonds the seal 91 to the lower end 103 by the same potting or molding compound which completes the fabrication of seal 91. If instead the seal is molded off-line as a separate piece and then assembled to the filter, it will have a formed upwardly opening channel 104.

As a separate component, seal 91 includes an annular body portion 91a and an annular sealing lip portion 105. The annular body portion 91a is shaped with the annular, upwardly opening channel. Annular sealing lip 105 extends in a radially inwardly and axially downwardly direction and is disposed in a spaced apart relation relative to the channel 104. The entirety of seal 91, including channel 104 and lip 105, is configured symmetrically throughout its entire circumference. Consequently, any diametral cutting plane through seal 91 will yield substantially the same cross sectional appearance as is provided in FIG. 4.

Channel 104 is sized and shaped so as to fit securely and snugly over and around the lower end 103 of filter element 92. This particular secure and snug fit could provide a sealed interface across the end of the filter element as is desired and required in order to preclude any air flow that might escape through that surface. If only a snug fit is used without any bonding adhesive, the end use will need to be a low load, low pressure situation. As illustrated, opposite sidewalls 108 and 109 of channel 104 are disposed against and axially extend up the sides of inner liner 99 and outer liner 100, respectively. Sidewalls 108 and 109 are considered to be part of the annular body portion 91a of seal 91.

Figure 6:
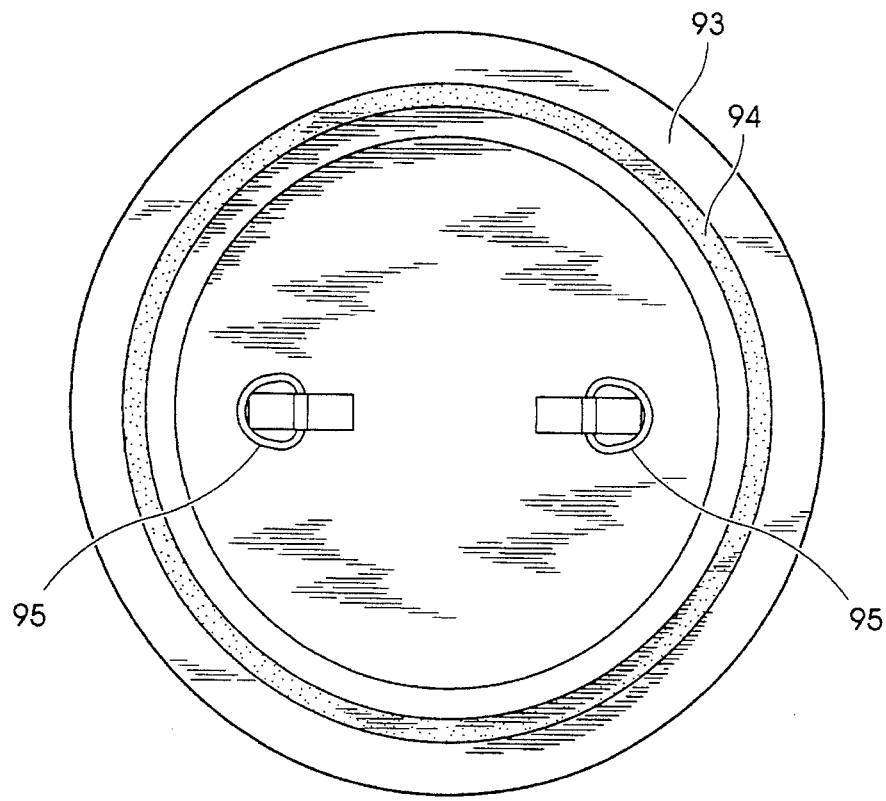
FIG. 6 is a top plan view of the FIG. 4 air filter according to the present invention.
Figure 7:
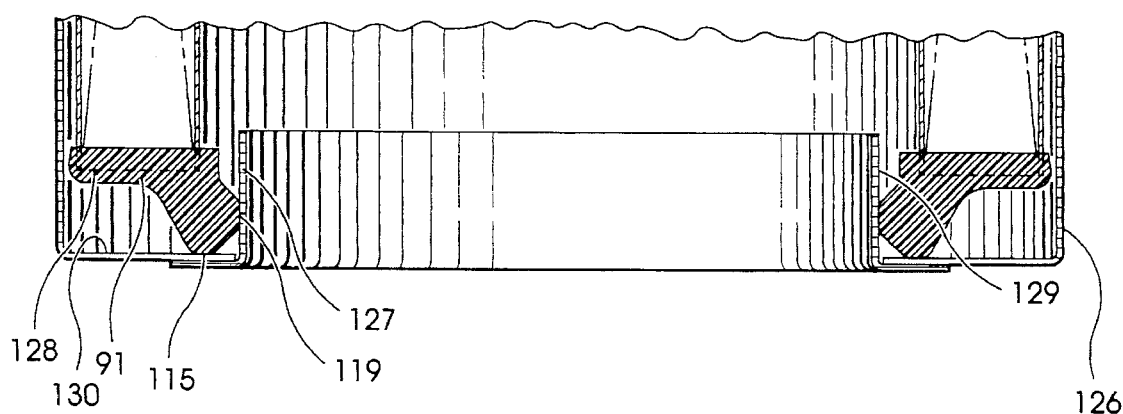
FIG. 7 is a partial, front elevational view in full section of the FIG. 4 filter seal as engaging a filter housing and center post in sealing contact both radially and axially according to the present invention.

The wall thickness of sidewall 108 is approximately 3.2 mm and the wall thickness of sidewall 109 is approximately 3.2 mm. The axial height of each sidewall, upwardly along each corresponding liner, is approximately 12.7 mm. The thickness of lower wall 110 of filter seal 91 which extends inwardly from sidewall 109 to the start of sealing lip 105 is approximately 5.6 mm. FIG. 6 provides a top plan view of the upper end of the air filter 90. Illustrated are the end plate 93, annular seal 94 and the two bail handles 95.

Figure 5:
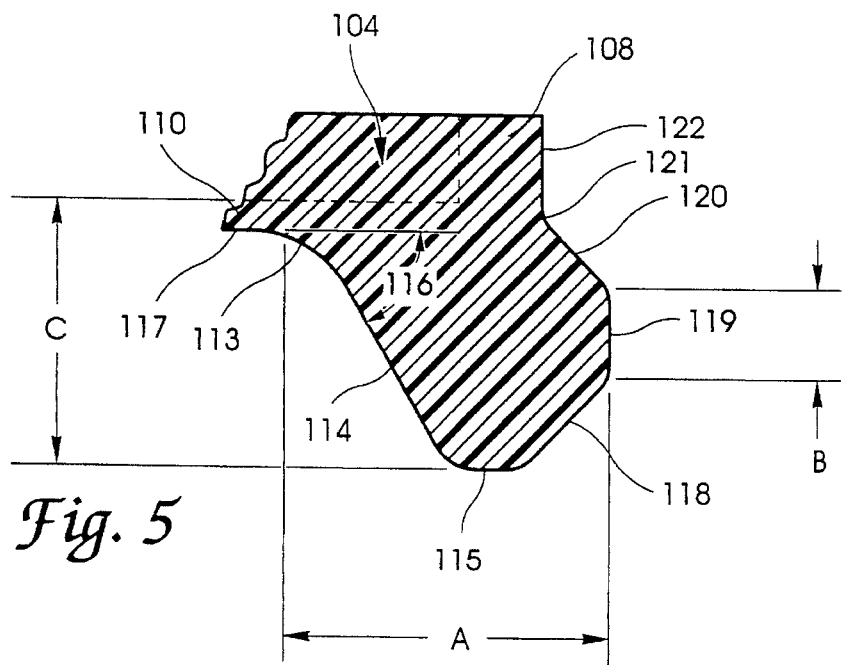
FIG. 5 is an enlarged detail of a portion of the FIG. 4 filter seal according to the present invention.

Referring now to FIG. 5, the specific geometry of sealing lip 105 is illustrated in greater detail, as an enlarged view. Since lip 105 is illustrated as a planar, full section view, lines or surfaces which are referred to herein as flat or straight are in fact circumferential or annular surfaces, often cylindrical, as would be understood by recognizing that filter seal 91 is symmetrical throughout its annular shape. Sealing lip 105 begins at the end of lower wall 110 below channel 104 with concave radiused surface 113 which has a radius of approximately 10 mm. Straight portion 114 extends to the lower tip which includes a flat lower surface 115 bordered by opposite convex corners. The angle 116 between the lower surface 117 of lower wall 110 and portion 114 is approximately 60 degrees. Surface 115 extends through the convex corner into the angled, straight portion 118 which leads into the straight, inside axial face 119. If the annular filter seal 91 is thought of as being assembled to the air filter 90 which in turn is assembled with a generally vertical (axial) orientation, then it would be appropriate to think of surface 115 as being substantially horizontal and axial face 119 as being substantially vertical. In fact, surface 115 and face 119 are disposed relative to each other at an approximate 90 degree angle. The specific relationship is important as will be described hereinafter since face 119 provides radial sealing and surface 115 provides axial sealing.

Inside axial face 119 is bordered by opposite convex corners, one being disposed between face 119 and portion 118 and the other convex corner being disposed between face 119 and portion 120. Face 119 extends through the convex corner into the angled, straight portion 120 and from there through concave portion 121 to the substantially straight, axial wall surface 122 (of sidewall 108).

Angled portion 118 is disposed at an angle of approximately 30 degrees relative to axial (cylindrical) face 119. Similarly, angled portion 120 is disposed at an angle of approximately 45 degrees relative to face 119. The approximate radial width of sealing lip 105 from face 119 to the center of radiused surface 113, identified as dimension "A" is approximately 28.0 mm. The axial height of face 119 between the opposing corners (dimension "B") is approximately 8.0 mm. Finally, the axial distance from surface 117 to surface 115 (dimension "C") is approximately 22.0 mm.

Figure 4:
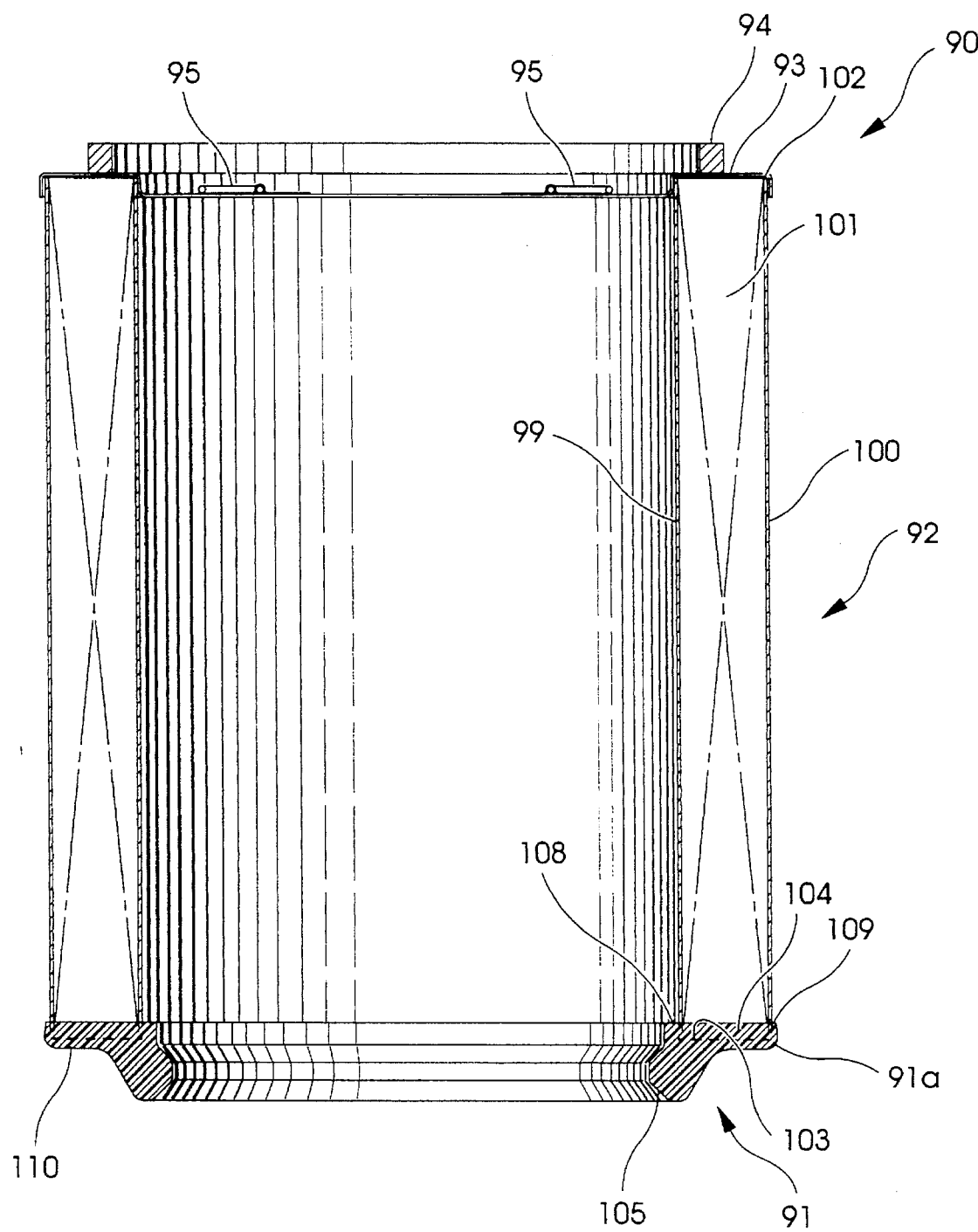
FIG. 4 is a front elevational view in full section of an air filter in combination with a filter seal according to one embodiment of the present invention.

One structural feature of the present invention which can be appreciated from the illustration of FIGS. 4 and 5 is the fact that the entirety of the sealing lip 105 is below the lower edge of filter element 92. This will be appreciated from the fact that the sealing lip 105 is effectively below the bottom surface of channel 104 which as described abuts up against the lower edge of filter element 92. In the context of the present invention the air filter 90 will be used in the orientation of FIG. 4. Consequently, descriptive terms such as "above" or "below", "upper" or "lower" and "inner" or "outer" as used herein as based upon the orientation of air filter 90 as illustrated in FIG. 4.

When the air filter 90 is installed in a suitable and compatible housing, an outlet member is used to route the filtered air flow from the interior of the air filter out of the filter housing. The lower or bottom wall of the housing receives the outlet member (center post) and this overall relationship is illustrated in a general or generic sense by the embodiments of FIGS. 1 and 2. The relationship of the housing, outlet member and filter seal is such that the filter seal provides a sealed interface axially between the filter seal and the bottom wall of the housing and radially between the filter seal and the outlet member.

In the FIG. 1 (prior art) illustration these two locations of sealing are achieved by two different seal shapes, locations and methods. The axial sealing is achieved at a location which is below the filter end plate 46 while the radial sealing is achieved at a location above the end plate. In the FIG. 2 (prior art) illustration there is . actually only one location of sealing provided by end cap 85 and this is a radial seal by means of compression.

The concern directed to sealing against the end wall of the housing is to preclude any direct air flow or bypass from the annular clearance space on the outside of the filter element to the exterior of the filter housing. The filtered air is intended to be used by the engine and if dirty air is drawn into the system and allowed to bypass the filter then damage to the engine may result. Any portion of the air which is allowed to bypass the filter will remain as dirty air.

While the radial seal is important, it is also important to seal the outlet member relative to the housing outer wall. One approach is to try and seal the outlet member 80 (FIG. 2) or the cylindrical inner wall 44 (FIG. 1) directly to the housing by the corresponding fit and method of attachment. This approach may use separate sealing members such as O-ring 81 (see FIG. 2).

In the present invention (see FIG. 7) the filter seal 91 provides a molded end cap and sealing gasket combination. The filter housing 126 receives a generally cylindrical center post 127 which concentrically fits within the housing 126 as is illustrated. All sealing between the filter seal 91 and the center post 127 (and housing 126) occurs below the lower surface 128 of the filter element 92. Sealing is accomplished through three different mechanisms. First, axial face 119 of filter seal 91 is axially deflected and placed in tension around the generally cylindrical, axial wall surface 129 of center post 127. Secondly, the lower surface 115 of the filter seal is placed in compression against the bottom surface 130 of the air filter housing. Finally, differential pressure forces cause the sealing lip 105 to seal more tightly against the center post 127 of the overall housing during engine operation.

These three modes of sealing in combination with the molded end plate design and the specific style of the sealing lip provide a unique and advantageous filter seal design which has not heretofore been provided by any reference or any combination of references.

Air filter 140 includes, in addition to filter seal 141, a generally cylindrical filter element 142, upper end plate 143, an optional upper end annular seal 144 and two bail handles 145 which are securely attached to end plate 143 in order to assist in lifting the air filter 140 out of its corresponding housing. Annular seal 144, while being illustrated, is still considered an optional component. Another option is to replace the two bail handles 145 with a single, larger bail handle (not illustrated).

Filter element 142 includes a perforate, generally cylindrical inner liner 149 and coaxial therewith a perforate, generally cylindrical outer liner 150. A generally cylindrical pleated paper filter 151 is disposed between the inner liner 149 and the outer liner 150. Filter element 142 is sealed closed across its upper end 152 by a covering layer of adhesive which securely bonds end plate 143 to the filter element. The opposite, lower end 153 of the filter element is sealed closed by radial air filter seal 141 which is a unitary, molded polyurethane member. As described herein one fabrication method is to mold seal 141 by means of a two-step process. While a single step process can be used, that procedure is relatively straight forward. The two-step method is believed to be unique and is thus discussed in greater detail herein. In the two-step method, the final process step actually bonds the seal 141 to the lower end 153 by the same potting or molding compound which completes the fabrication of seal 141. If instead the seal is molded off-line as a separate piece and then assembled to the filter, it will have a formed upwardly opening channel 154.

As a separate component, seal 141 includes an annular body portion 141a and an annular sealing lip portion 155. The annular body portion 141a is shaped with the annular, upwardly opening channel. Annular sealing lip 155 extends in a radially inwardly and axially downwardly direction and is disposed in a spaced apart relation relative to the channel 154. The entirety of seal 141, including channel 154 and lip 155, is configured symmetrically throughout its entire circumference. Consequently, any diametral cutting plane through seal 141 will yield substantially the same cross sectional appearance as is provided in FIG. 8.

Channel 154 is sized and shaped so as to fit securely and snugly over and around the lower end 153 of filter element 142. This particular secure and snug fit could provide a sealed interface across the end of the filter element as is desired and required in order to preclude any air flow that might escape through that surface. If only a snug fit is used without any bonding adhesive, the end use will need to be a low load, low pressure situation. As illustrated, opposite sidewalls 158 and 159 of channel 154 are disposed against and axially extend up the sides of inner liner 149 and outer liner 150, respectively. Sidewalls 158 and 159 are considered to be part of the annular body portion 141a of seal 141.

The wall thickness of sidewall 158 is approximately 3.2 mm and the wall thickness of sidewall 159 is approximately 2.5 mm. The axial height of sidewall 158 upwardly along its corresponding liner from the bottom of channel 154, is approximately 20.3 mm. The axial height of sidewall 159 from the bottom of channel 154 is approximately 12.7 mm. The thickness of lower wall 160 of filter seal 141 which extends inwardly from sidewall 159 to the start of sealing lip 155 is approximately 2.5 mm.

Referring now to FIG. 9, the specific geometry of sealing lip 155 is illustrated in greater detail, as an enlarged view. Since lip 155 is illustrated as a planar, full section view, lines or surfaces which are referred to herein as flat or straight are in fact circumferential or annular surfaces, often cylindrical, as would be understood by recognizing that filter seal 141 is symmetrical throughout its annular shape. Sealing lip 155 begins at the end of lower wall 160 below channel 154 with concave radiused surface 163 which has a radius of approximately 12.7 mm.

Concave radiused surface 163 blends smoothly into convex radiused lower tip 164. The radius of curvature for hip 164 is approximately 4.7 mm. The smooth convex curvature of tip 164 transitions into a substantially flat (in cross section) portion 165. Portion 165 extends on a 30 degree incline relative to vertical and transitions into an inwardly protruding radial lip 166 which has a convex radius measuring approximately 3.0 mm. Lip or rib 166 smoothly blends into a concave radiused portion 167 with a radius measurement of approximately 2.0 mm. Portion 167 smoothly transitions into a second inwardly protruding radial lip or rib 168. The convex radius of lip 168 measures approximately 4.45 mm. The shape of sealing lip 155 is such that lip 166 does not protrude in a radially-inward direction as far as lip 168 protrudes. Lip 168 smoothly blends into concave radiused portion 169. The radius of curvature of portion 169 is approximately 10.0 mm. Portion 169 blends into inner side wall 158. The curved, annular shape of radial lips (or ribs) 166 and 168 provide radial sealing as will be described.

If the annular filter seal 141 is thought of as being assembled to the air filter 140 which in turn is assembled with a generally vertical (axial) orientation, then it would be appropriate to think of tip 164 as being substantially horizontal and lips 166 and 168 as being substantially vertical. In fact, the outer edges of lips 166 and 168, if projected vertically, and the lowermost edge of tip 164, if projected horizontally, are disposed relatively to each other at an approximate 90 degree angle. The specific relationship is important as will be described hereinafter since lips 166 and 168 are designed to provide radial sealing and tip 164 is designed to provide axial sealing.

In the context of the present invention the air filter 140 will be used in the orientation of FIG. 8. Consequently, descriptive terms such as "above" or "below", "upper" or "lower" and "inner" or "outer" as used herein as based upon the orientation of air filter 140 as illustrated in FIG. 8.

When the air filter 140 is installed in a suitable and compatible housing, an outlet member is used to route the filtered air flow from the interior of the air filter out of the filter housing. The lower or bottom wall of the housing receives the outlet member (center post) and this overall relationship is illustrated in a general or generic sense by the embodiments of FIGS. 1 and 2. The relationship of the housing, outlet member and filter seal is such that the filter seal provides a sealed interface axially between the filter seal and the bottom wall of the housing and radially between the filter seal and the outlet member.

The concern directed to sealing against the end wall of the housing is to preclude any direct air flow or bypass from the annular clearance space on the outside of the filter element to the exterior of the filter housing. The filtered air is intended to be used by the engine and if dirty air is drawn into the system and allowed to bypass the filter then damage to the engine may result. Any portion of the air which is allowed to bypass the filter will remain as dirty air.

While the radial seal is important, it is also important to seal the outlet member relative to the housing outer wall. One approach is to try and seal the outlet member 80 (FIG. 2) or the cylindrical inner wall 44 (FIG. 1) directly to the housing by the corresponding fit and method of attachment. This approach may use separate sealing members such as O-ring 81 (see FIG. 2).

In the FIG. 8 embodiment of the present invention (see FIG. 10) the filter seal 141 provides a molded end cap and sealing gasket combination. The filter housing 176 receives a generally cylindrical center post 177 which concentrically fits within the housing 176 as is illustrated. Sealing between the filter seal 141 and the center post 177 (and housing 176) occurs throughout the circumference of the filter element 142. Sealing is accomplished through three different mechanisms. First, at least lip 168 of filter seal 141 is axially deflected and placed in tension around the generally cylindrical, axial wall surface 179 of center post 177. Secondly, tip 164 of the filter seal is placed in compression against the bottom surface 180 of the air filter housing. Finally, differential pressure forces cause the sealing lip 155 to seal more tightly against the center post 177 of the overall housing during engine operation.

These three modes of sealing in combination with the molded end plate design and the specific style of the sealing lip provide a unique and advantageous filter seal design which has not heretofore been provided by any reference or any combination of references.

The filter seals of the present invention as illustrated in FIGS. 4, 5, 7, 8, 9, and 10 each comprise an elastomeric member which under conventional or traditional fabrication techniques would be molded as a unitary member. It is possible to bond each seal to the corresponding filter by a suitable adhesive when the seal is molded as a separate component. It is also possible to mold the seal (speaking now generically of either seal type) directly to the filter end such that the bond is created by the same molding or potting compound which is used for the seal. The specific molding method might include injection molding or simply pouring the liquid molding compound (potting compound) into an appropriately configured mold. When the compound cures or sets up, the mold is then opened or released and the filter seal is removed. In many applications, this type of fabrication procedure is acceptable and is reasonably efficient. What one obtains as a result is a separate, unitary member which can then be used directly or installed into some other system or assembly. In other words, if the output of the first (and only) molding step is in fact the finished product or part, then the normal and traditional molding techniques would be suitable.

With either embodiment of the present invention, the filter seal which is provided (i.e., created) is later bonded to and around the lower end of a pleated paper (or other media) filter element. The general style and configuration of how the filter seal is positioned around and secured to the lower end of a filter element is clearly illustrated in FIG. 4 and in FIG. 7. Depending upon the particular application and the end-use environment, a molded member such as filter seal 91 or 141 could be designed with an inner, annular ring channel which is sized and shaped so as to create an interference fit with the end of the filter element. This particular construction technique would then allow the filter seal 91 or 141 to simply be pressed or pried onto the end of the filter element and with a slight interference fit and some elasticity, the filter seal should hold itself securely in position on the end of the filter element, at least in low pressure, low load environments. Securing adhesive could be used to enhance the strength of the assembly.

This method can certainly be suitable in certain situations, more likely with other molded members and different applications than with the present invention. When a filter seal such as filter seal 91 or 141 is going to be subjected to substantial loads and pressures, it is desirable to securely attach the filter seal to the filter element by something more than an elastomeric interference fit. It is desirable to actually bond the filter seal to the end of the filter element. However, the step of bonding the molded filter seal to the end of the filter media (filter element) requires a separate production step and the application of a layer of potting compound or adhesive in order to effect the bonding.

In most applications the ends of the filter element need to be sealed closed so as to prevent any by-pass flow of the fluid being filtered. One option is to try and combine the bonding step with the sealing step. However, when the filter seal has ally type of irregular shape some type of fixture is necessary in order to hold and position the filter seal while the potting compound sets up or cures. This fixture would also enable the filter element to be located on or within the filter seal. It can be a relatively complex manufacturing operation to get all the parts properly arranged and positioned and then to hold the assembly properly aligned while the potting compound cures.

Another option for creating a unitary filter seal and endplate which is bonded to the end of the filter media (filter element) is to position the filter element down in to a potting mold and then fill the mold with a polyurethane potting compound. With the correct dimensioning and fixturing, the potting compound will flow up and around as well as over the end of the filter element. As a result, the molded endplate/filter seal combination is created while it is concurrently bonded to the end of the filter element. While this "molded-in" approach of affixing the filter element to the filter seal while creating a molded endplate may seem to be advantageous, it requires complex and fairly sophisticated tooling and fixtures. This complexity increases the expense of the manufacturing operation.

The preferred procedure according to the present invention in order to create either filter seal 91 or filter seal 141 and bond it to the filter element is to follow a two-step molding operation. The basics of the two-step operation are illustrated in FIGS. 11, 12 and 13.

Figure 11:
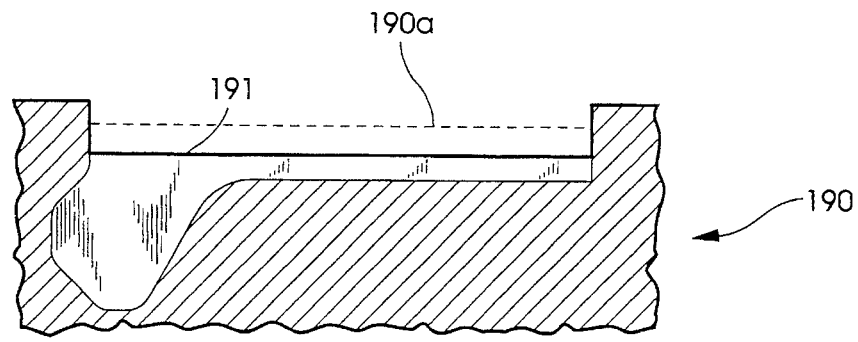
FIG. 11 is a partial, front elevational view in full section of a potting mold which is suitable to create a portion of the FIG. 4 filter seal.
Figure 12:
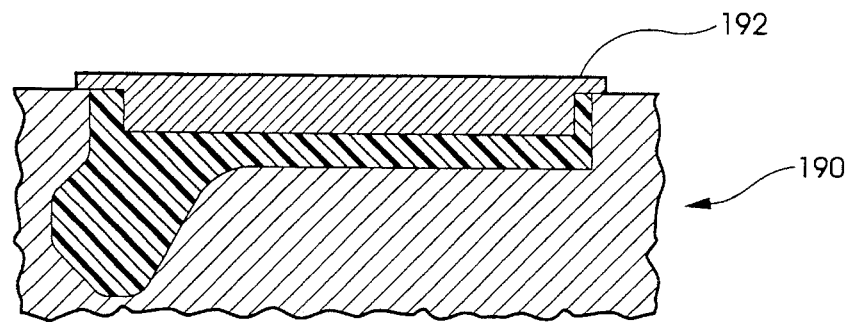
FIG. 12 is a partial, front elevational view in full section of the FIG. 11 potting mold in combination with an annular ring plug for the purposes of shaping a first portion of the FIG. 4 filter seal which is to be molded.

Referring first to FIG. 11, there is illustrated a potting mold 190 which includes a recessed area or pocket 191 whose shape approximates the shape of the lower portion of the desired filter seal 91. It is to be understood that the description of FIGS. 11–13 and the corresponding method are equally applicable for filter seal 141.

The first step in the two-step operation is to make a first pour of a liquid polyurethane potting compound into the recessed area 191 of the potting mold 190 up to the level of broken line 190a. An annular ring plug 192 is then centered in the upper or top area of the mold in order to push away the potting compound and prevent it from filling in this area (see FIG. 12). The result of this first step is to create a molded lower portion 193 of the final filter seal 91 which is desired to be created for the application illustration in FIGS. 4–7. This annular ring-shaped lower portion 193 has a hollow or open annular ring-shaped interior 194, the result of molding around the plug 192 which is then removed after the polyurethane molding compound cures. This hollow or open interior 194 in turn is suitably sized and shaped so as to receive the lower end 195 of generally cylindrical filter element 196 (see FIG. 13). The lower portion then becomes a potting shell for receiving the filter element after a second pour of more potting compound.

Figure 13:
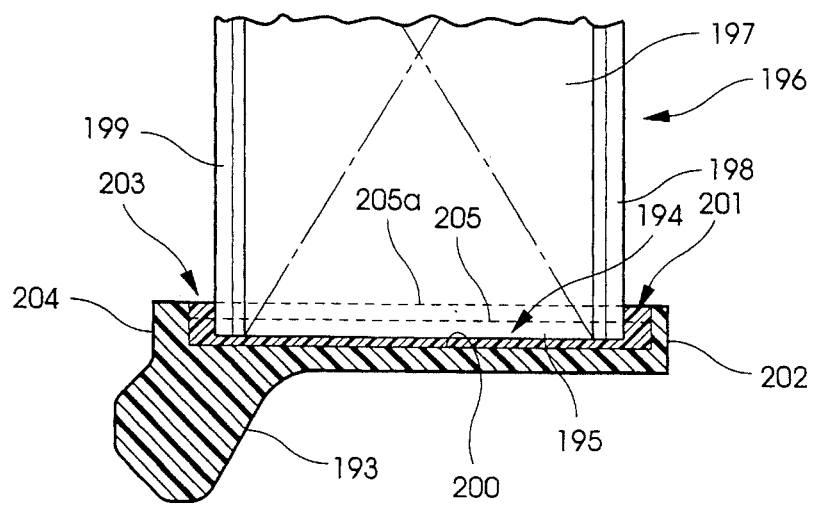
FIG. 13 is a partial, front elevational view in full section of a filter element positioned within the molded member which comes from the FIG. 12 mold.

In the FIG. 13 illustration the filter element 196 includes a filter media 197, an outer wrap or liner 198 and an inner liner 199. These filter liners are each generally cylindrical or of an annular ring shape. The lowermost ends, or surfaces of each liner and of the filter media are substantially flush with each other and each is inserted into a partially filled mold cavity, adjacent surface 200 of the molded lower portion 193. A first annular clearance space 201 is left between outer liner 198 and outer annular wall 202 of lower portion 193. A second annular clearance space 203 is left between the inner liner 199 and the inner annular wall 204 of lower portion 193. The outer and inner annular walls are created as a molding consequence of the plug 192 being smaller than the original mold and generally centered or concentric within the mold.

Broken line 205 represents the partial fill line for the second shot of liquid polyurethane potting compound which is poured into open interior 194 prior to inserting the filter element in order to complete the fabrication of the filter seal. Line 205 as a partial-fill line is below the upper edge of the molded lower portion 193. The molded lower portion 193 thus actually serves as a shell or potting mold for this second pouring of liquid potting compound. When the filter element is inserted into the potting compound, the lower end of the filter element is sealed such that there is a layer of potting compound between surface 200 and the lower end of the filter element. The volume displacement of the filter element causes the potting compound to rise to the final level represented by line 205a. As the second volume of potting compound fills in and around all of the voids, seams and crevices of the lower end of the filter element and its various component parts, it securely bonds the filter element to the molded lower portion 193. This second pouring of potting compound also seals closed the end of the filter media thus precluding any type of bypass flow of the fluid to be filtered which might otherwise occur.

The two-step molding operation first creates a first part of the filter seal and then uses that first park as a molding fixture or potting shell for creating the remainder of the filter seal by means of a second pour of liquid potting compound. In this way the filter element can be positioned within the first part of the filter seal after the second step (second pouring). This second volume of potting compound finishes the fabrication of the filter seal, bonds the filter seal to the filter element and seals closed the end of the filter element. Each of these various steps are achieved by a single processing step.

One aspect of the described two-step molding operation is the ability to use two different molding materials (i.e. potting compounds). The shell portion could be fabricated from a first material with one set of selected properties and then the second pour could use a different material with a different set of material properties. It is also envisioned to use the same basic material but with different properties, such as durometer.

One alternative to the foregoing two-step operation is to create the lower, first portion of the filter seal by means of an injection molding operation. A suitably designed injection mold can be used to create the molded lower portion 193 and then use it for the second step of the two-step operation. So long as the molded lower portion 193 has the size and shape required for the finished filter seal and for allowing the lower portion to be used as a mold or potting shell, the method or technique used to create the lower portion can vary.

While the first pouring operation of FIGS. 11 and 12 is believed to be the preferred method of fabricating the molded lower portion 193, other methods can be used. A further option with injection molding is to design the injection equipment so that various components of the molding compound can be premixed automatically and then metered out for the correct charge depending on the size and shape of the filter seal portion being molded.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An annular filter seal for receipt by a generally cylindrical filter element which is installed within a generally cylindrical filter housing, said filter housing defining a hollow interior and having a substantially planar end panel which defines an end opening, said filter housing including a generally cylindrical outlet member which is assembled to said substantially planar end panel and which includes a center post portion that extends into said hollow interior, said filter seal comprising:

an annular body portion formed with an annular receiving channel which is sized to receive one end of said filter element; and an annular sealing lip portion disposed in spaced relation to said receiving channel and including a radial-sealing surface configured with two inwardly directed curved annular ribs constructed and arranged to provide radial sealing against the center post portion of said outlet member while in tension, said two inwardly directed curved annular ribs being axially separated by an annular recess of a concave radiused cross section, said annular sealing lip portion further including a radiused annular axial-sealing surface which is constructed and arranged to provide axial sealing against the substantially planar end panel of said housing when said axial-sealing surface is in compression, said axial-sealing surface being connected to one of said two curved annular ribs by an annular inclined portion.

2. The annular filter seal of claim 1 wherein said sealing lip portion further includes a radiused annular surface extending between said radial-sealing surface and said annular body portion.

3. The annular filter seal of claim 2 wherein said sealing lip portion further includes a radiused annular surface extending between said axial-sealing surface and said annular body portion.

4. The annular filter seal of claim 3 wherein the radiused annular surface extending between the radial-sealing surface and the annular body portion has a substantially concave shape in lateral section.

5. The annular filter seal of claim 4 wherein the radiused annular surface extending between the axial-sealing surface and the annular body portion has a substantially concave shape in lateral section.

* * * * *

UNITED STATES PATENT AND TRADEMARK OFFICE
CERTIFICATE OF CORRECTION

PATENT NO. : 5,556,440
DATED : Sep. 17, 1996
INVENTOR(S) : Gene Mullins, et al.

It is certified that error appears in the above-identified patent and that said Letters Patent is hereby corrected as shown below:

In Col. 2, at line 19, insert --Patent Application Serial No. 08/147,647 which was -- after "U.S.".

In Col. 5, at line 28, insert --1-- after "approximately".

In Col. 8, at line 55, replace "tooled" with --mold--.

In Col. 12, at line 12, replace "hip" with --tip--.

In Col. 14, at line 17, replace "ally" with --any--.

In Col. 15, at line 38, replace "park" with --part--.

Signed and Sealed this

Seventeenth Day of December, 1996

Attest:

BRUCE LEHMAN

Attesting Officer    Commissioner of Patents and Trademarks